(12) United States Patent
Robinson

(10) Patent No.: US 12,216,631 B1
(45) Date of Patent: Feb. 4, 2025

(54) SYSTEM AND METHOD FOR SEARCHING, COMPARING, AND ANALYZING THE CONTENTS OF AUDIO, MUSIC, VIDEO, AND OTHER TIMELINES

(71) Applicant: Sonic Bloom, LLC, Cambridge, MA (US)

(72) Inventor: Eric D. Robinson, Cambridge, MA (US)

(73) Assignee: Sonic Bloom, LLC, Seattle, WA (US)

( * ) Notice: Subject to any disclaimer, the term of this patent is extended or adjusted under 35 U.S.C. 154(b) by 0 days.

(21) Appl. No.: 16/278,687

(22) Filed: Feb. 18, 2019

Related U.S. Application Data

(60) Provisional application No. 62/631,527, filed on Feb. 16, 2018.

(51) Int. Cl.
  G06F 16/22 (2019.01)
  G06F 16/2458 (2019.01)
  G06F 16/41 (2019.01)

(52) U.S. Cl.
  CPC ...... *G06F 16/2228* (2019.01); *G06F 16/2477* (2019.01); *G06F 16/41* (2019.01)

(58) Field of Classification Search
  CPC .. G06F 16/2228; G06F 16/2477; G06F 16/41; H04N 21/4532; H04L 67/12
  USPC ........................................................ 707/746
  See application file for complete search history.

(56) References Cited

U.S. PATENT DOCUMENTS

| | | | |
|---|---|---|---|
| 8,234,284 B2 * | 7/2012 | Shao ................ | G06F 16/685 707/748 |
| 9,116,988 B2 * | 8/2015 | Flick ............... | H04N 21/85406 |
| 9,138,652 B1 * | 9/2015 | Thompson ........ | H04N 21/237 |
| 9,620,105 B2 * | 4/2017 | Mason .............. | G10L 15/02 |
| 9,788,777 B1 * | 10/2017 | Knight ............. | G10L 25/63 |
| 2006/0036960 A1 * | 2/2006 | Loui ................ | G06F 16/54 715/764 |
| 2007/0250901 A1 * | 10/2007 | McIntire .......... | H04N 21/8586 725/146 |
| 2008/0256042 A1 * | 10/2008 | Whitman ......... | G06F 16/68 |
| 2009/0055417 A1 * | 2/2009 | Hannuksela ..... | G06F 16/907 |
| 2010/0146009 A1 * | 6/2010 | Kandekar ........ | G06F 16/68 707/803 |
| 2011/0022589 A1 * | 1/2011 | Bauer .............. | G06F 16/748 707/723 |
| 2011/0052146 A1 * | 3/2011 | Murthy ........... | H04N 21/4722 386/290 |
| 2011/0112671 A1 * | 5/2011 | Weinstein ........ | H04N 21/4755 700/94 |

(Continued)

*Primary Examiner* — Hosain T Alam
*Assistant Examiner* — Nicholas E Allen
(74) *Attorney, Agent, or Firm* — SLEMAN & LUND LLP

(57) ABSTRACT

A system that enables the efficient identification and/or retrieval of certain timeline content from amongst e.g. a great many options of similar content. Generally, a set of timeline metadata that describes some aspect or aspects of the content of the timeline is produced. This set of timeline metadata includes timing and descriptive information that maps the described aspect or aspects to specific locations within the source timeline. When a user initiates a search of the timeline content, the search criteria is quickly matched against the contents of this separate set of metadata, rather than the raw timeline data itself. When the search criteria is matched, the metadata, original data, or both may be returned.

17 Claims, 9 Drawing Sheets

(56) References Cited

U.S. PATENT DOCUMENTS

| | | | | |
|---|---|---|---|---|
| 2011/0214556 A1* | 9/2011 | Greyson | ................... | G10H 1/40 |
| | | | | 84/611 |
| 2012/0316660 A1* | 12/2012 | Luo | ......................... | G06F 16/78 |
| | | | | 700/94 |
| 2013/0151534 A1* | 6/2013 | Luks | ........................ | G06F 16/71 |
| | | | | 707/742 |
| 2013/0170813 A1* | 7/2013 | Woods | .................... | H04N 5/765 |
| | | | | 386/200 |
| 2013/0325869 A1* | 12/2013 | Reiley | ..................... | G06F 16/41 |
| | | | | 707/741 |
| 2013/0326406 A1* | 12/2013 | Reiley | ..................... | G06F 3/048 |
| | | | | 715/810 |
| 2014/0161356 A1* | 6/2014 | Tesch | ........................ | G06K 9/00 |
| | | | | 382/196 |
| 2015/0150023 A1* | 5/2015 | Johnson | ................ | G06F 9/4843 |
| | | | | 718/107 |
| 2015/0254341 A1* | 9/2015 | Rai | ........................ | H04H 60/56 |
| | | | | 707/736 |
| 2015/0365710 A1* | 12/2015 | Bertrand | ............ | H04N 21/8133 |
| | | | | 725/32 |
| 2015/0375117 A1* | 12/2015 | Thompson | ............... | A63F 13/79 |
| | | | | 463/9 |
| 2016/0098998 A1* | 4/2016 | Wang | ..................... | G06F 16/683 |
| | | | | 704/246 |
| 2016/0306870 A1* | 10/2016 | Yoselis | .............. | G06K 9/00315 |
| 2017/0277700 A1* | 9/2017 | Davis | ................... | G06F 16/7867 |
| 2017/0364981 A1* | 12/2017 | Simpson | ............. | G06Q 30/0643 |
| 2018/0032305 A1* | 2/2018 | Cameron | ................. | G10L 25/63 |
| 2018/0032612 A1* | 2/2018 | Kariman | ............... | G06F 16/164 |

\* cited by examiner

SYSTEM AND METHOD FOR SEARCHING, COMPARING, AND ANALYZING THE CONTENTS OF AUDIO, MUSIC, VIDEO, AND OTHER TIMELINES

RELATED APPLICATIONS

This application claims the benefit of U.S. Provisional Application Ser. No. 62/631,527, filed Feb. 16, 2018, entitled A SYSTEM AND METHOD FOR SEARCHING, COMPARING, AND ANALYZING THE CONTENTS OF AUDIO, MUSIC, VIDEO, AND OTHER TIMELINES, the entire disclosure of which is herein incorporated by reference.

FIELD OF THE INVENTION

The invention relates to systems and methods for searching, comparing, and analyzing the contents of a sequence of data with temporal information (a timeline, e.g. that of audio, or video).

BACKGROUND OF THE INVENTION

Finding music for a particular purpose is a challenging and time consuming process. Consider a scenario wherein a video creator working with video editing software has reached the point in their production process whereby they would like to add music to accompany the visuals. They may have a progression of mood, feeling, or emotion in mind when they set out to identify music to accompany their production. Further, the video creator may wish for the music to align as closely to the visuals as possible, reducing the number of audio and/or video adjustments required after importing the music. Many businesses provide large libraries of music to satisfy the needs of these video creators, often citing hundreds of thousands, to millions of licensable music tracks. To reduce production costs, the video creator may decide to license a music track from one such library, rather than hire a composer to develop music specifically for the video. The video creator searches these large music libraries using a combination of keywords that describe the audio, whether by artist, mood, instrument, etc. Some libraries may permit a search by overall tempo. Results of these searches are typically presented as large lists and allow the user to play a preview version of the audio. The video creator may listen to a large number of tracks before making a selection, spending hours "auditioning" the music tracks. Once a track (or tracks) is selected, they may import it into the project and find that the video needs to be adjusted for timing, to ensure that the visual progression matches the musical one.

In another scenario, a user may enjoy the emotional content of a certain pop song; how it made them feel as they listened to it. Music subscription services (e.g. Spotify, Apple Music, or Pandora) provide immediate access to millions of tracks and the user may want to find songs on such a service that match the feeling, or the progression of feelings, in their previous song. These music subscription services tend to allow searching by high-level mood or basic keywords (e.g. artist or title), rather than by emotional content, often returning thousands of results that may vary widely in style, emotion, etc.

In both of the above scenarios, a user of a media data collection currently enters desired keywords into a search query to filter the collections for potential candidates (a music track to accompany a video, or one that follows a specific emotional progression). As this metadata is high level in the sense that it describes an entire entry (e.g. song or video) within the collection holistically, the user must view, listen to, or otherwise inspect the contents of the candidates to definitively determine whether a candidate, whether in part or whole, is useful or not. The process of checking a single candidate may take seconds to minutes and search query responses may return hundreds, and even thousands, of results. Identifying useful results within such a collection can therefore be an extremely time consuming process.

SUMMARY OF THE INVENTION

With present systems, a deep content search of timeline content (e.g. digital video or audio) is untenable due to the amount of data required to process, as well as a general lack of algorithms capable of anticipating human emotional response to said data. The present application overcomes the shortcomings of the prior art with a system that enables the efficient identification and/or retrieval of certain timeline content from amongst e.g. a great many options of similar content. Generally, a set of timeline metadata that describes some aspect or aspects of the content of the timeline is produced. This set of timeline metadata includes timing and descriptive information that maps the described aspect or aspects to specific locations within the source timeline. When a user initiates a search of the timeline content, the search criteria is quickly matched against the contents of this separate set of metadata, rather than the raw timeline data itself. When the search criteria is matched, the metadata, original data, or both may be returned.

BRIEF DESCRIPTION OF THE DRAWINGS

The invention description below refers to the accompanying drawings, of which.

DETAILED DESCRIPTION

Figure 1:
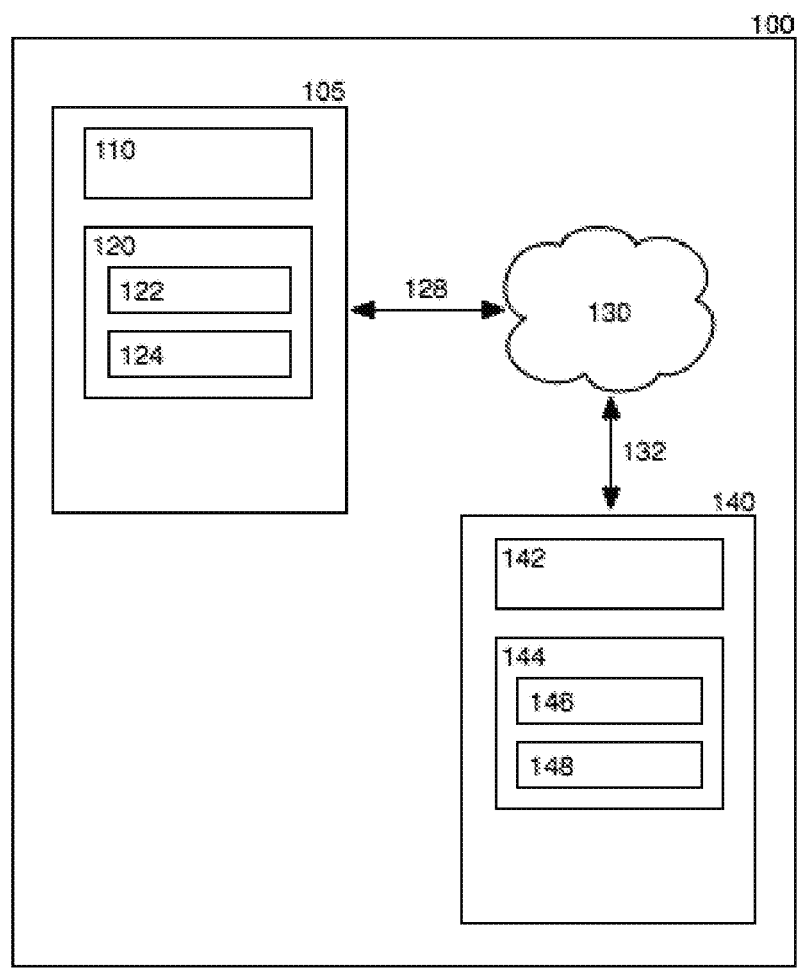
FIG. 1 is a block diagram showing a computing system according to one or more aspects of the disclosure and associated, illustrative embodiments.

FIG. 1 is a block diagram showing a computing system 100 according to one or more aspects of the disclosure and associated, illustrative embodiments. As shown, the system 100 can include a computing device 105. The computing device 105 can be any type of computing device, such as a personal computer, laptop computer, mobile device, tablet computer, etc. As shown, the computing device 105 can include a processor 110, a memory 120, and any other components typically present in general purpose computers. The memory 120 can be a tangible non-transitory computer-readable medium and can store information accessible by the processor 110, such as program instructions 122 that may be retrieved and executed by the processor and/or data 124 that may be retrieved, manipulated, or stored by the processor 110 or any other component of the computing device 105. The processor 110 can be any type of processor, such as a processor manufactured or designed by Intel®, AMD®, or ARM®. The memory 120 can be any type of memory, such as volatile or non-volatile types of memory. In particular, the memory can include one or more of the following: ROM, such as Mask ROM, PROM, EPROM, EEPROM; NVRAM, such as Flash memory; Early stage NVRAM, such as nvSRAM, FeRAM, MRAM, or PRAM, or any other type, such as, CBRAM, SONOS, RRAM, Racetrack memory, NRAM, Millipede memory, or FJG. Any of the methods, routines, procedures, steps, blocks, etc., discussed herein in the present disclosure can be implemented as a set of program instructions stored in the memory 120, such that, when executed by the processor 110, can cause the processor 110 to perform the corresponding method, routine, procedure, step, block, etc.

Although depicted as single elements in FIG. 1, the processor 110 and memory 120 can respectively comprise one or more processors and/or memory elements that can communicate by a wired/wireless connection. In this regard, the processor 110 can comprise a plurality of processors that can cooperate to execute program instructions. Moreover, the memory 120 can comprise a plurality of memories that can cooperate to store instructions and/or data.

The computing device 105 can also accept user input according to a number of methods, such as by a mouse, keyboard, trackpad, touchscreen interface, or the like (not shown). The computing device 105 can also be operably connected to a display (not shown).

The computing device 105 can also include one or more components to allow for wired or wireless communication via link 128 with any other computing device, such as server cloud 130 or computing device 140. The server cloud 130 can comprise one or more server computing devices, where such server computing devices can include similar components to those set forth with respect to device 105. Similarly, computing device 140 can include a processor 142, memory 144, instructions 146, and data 148, similar to the features set forth with respect to device 105 and can be connected directly or indirectly to computing device 105 via link 132 and server cloud 130.

Timeline content, an example being a music file, may be stored in an encoded format that is difficult to search efficiently. At one level, the file itself may be represented in the storage medium as compressed or encoded audio data. To view the raw contents of such a music file, it, or a portion of it, is typically decompressed or decoded. At another level, the audio data itself is represented by a dense, ordered array of numbers, the density of which is determined by a Sample Rate. A Sample Rate of 44100 means that every 44100 numbers describes one second of audio data. To a computer, this data is nothing more than a series of numbers. To a listening human, however, the audio data may be interpreted as a recording of a Beethoven symphony as it is played back. Many algorithms exist that (to varying degrees of success) attempt to similarly determine the contents of such data but generally require full decoding/processing of the entire music file. This can mean processing tens to hundreds of megabytes of data, an expensive and time consuming operation. To reduce the cost of searching this data directly, the music file may be accompanied by, or contain, a set of metadata that describes the contents. This metadata is usually stored as a set of key-value pairs that describe the contents at a holistic high level (e.g. artist, title, tempo [bpm], genre, or year): high level descriptors of the contents of the audio. Such metadata does not, for example, contain information about the emotional arc of the recorded music. As another example, this metadata does not contain information about the timing or duration of the various musical parts (e.g. chorus timings). To identify such information, an interested user would listen to the music and manually identify such information. This issue is compounded when trying to search for a specific feature (e.g. emotional arc or chorus duration) against a large collection (hundreds, thousands, millions, etc.) of music files.

The present embodiment overcomes this flaw with a system that enables rapidly searching the contents of timeline data and matching one or more results with a given search criteria. It should be noted that this search may be used to identify timelines that share some similarity from amongst the larger body of timeline data being searched. In short, the system automatically provides a certain measure of content-similarity matching. Generally, a separate set of timeline metadata is produced that "maps" a multiplicity of features along the source timeline data itself with a multiplicity of time "locations". In this way, timeline metadata may be viewed as a set of directed abstractions of the content of the source data, while maintaining important temporal information. When a feature search is conducted, this timeline metadata may be searched instead of (or along with) the existing data and keyword metadata. This special metadata thereby enables the rapid identification, comparison, and further, higher-level analysis of the source timeline data that it describes.

Figure 2:
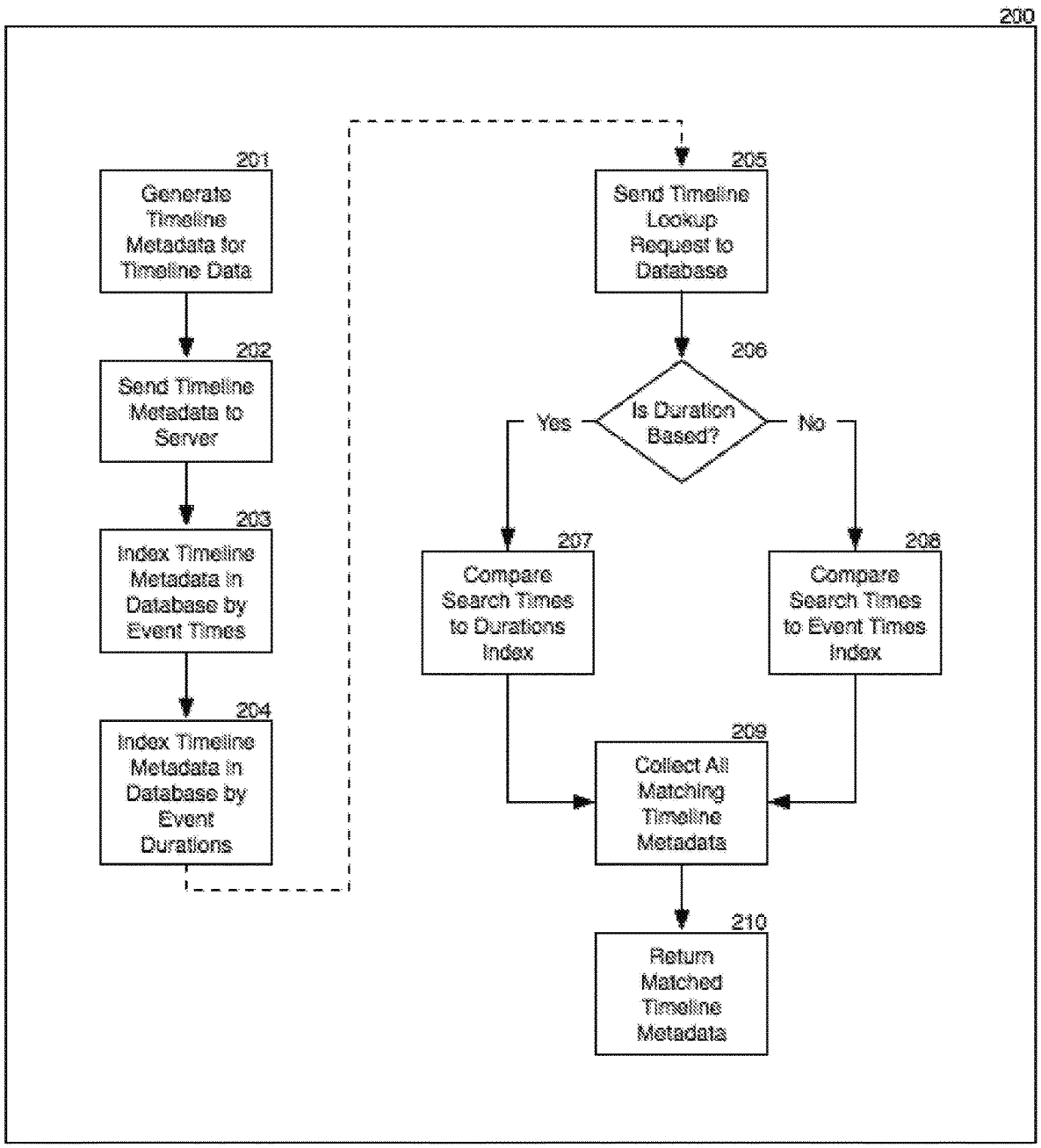
FIG. 2 is a flow chart depicting an overview of the system and method according to one or more aspects of the disclosure.

FIG. 2 is a flow chart depicting an overview of the system and method according to one or more aspects of the disclosure. At block 201, a timeline data (e.g. video or audio file) is processed to generate a timeline metadata. At block 202, the timeline metadata is sent to a database of one or more computing devices, such as those described above. At block 203, the timeline metadata is indexed by the database by event time. For each event time found within the timeline metadata, an entry that identifies the timeline metadata (and, thus, the source timeline data) is added to an event time index. At block 204, the timeline metadata is indexed by the database by event duration. For each event duration found within the timeline metadata, an entry that identifies the timeline metadata (and, thus, the source timeline data) is added to an event duration index. At some point later at block 205, a timeline lookup request is received by the database. The timeline lookup request may include one or more search times to be compared to event times or durations described below. At block 206, the database determines the type of the lookup. If the lookup is a duration-based lookup, then flow proceeds to block 207 where the provided search times are compared with the durations stored in the event duration index. If the lookup is an event time-based lookup, then flow proceeds to block 208 where the provided search times are compared with the event times stored in the event times index. Once index comparison is complete, all timeline metadata located in the index that matched any of the search times provided at block 205 are collected by the database at block 209. At block 210, the collection of matched timeline metadata is returned to the issuer of the request received at block 205.

Figure 3:
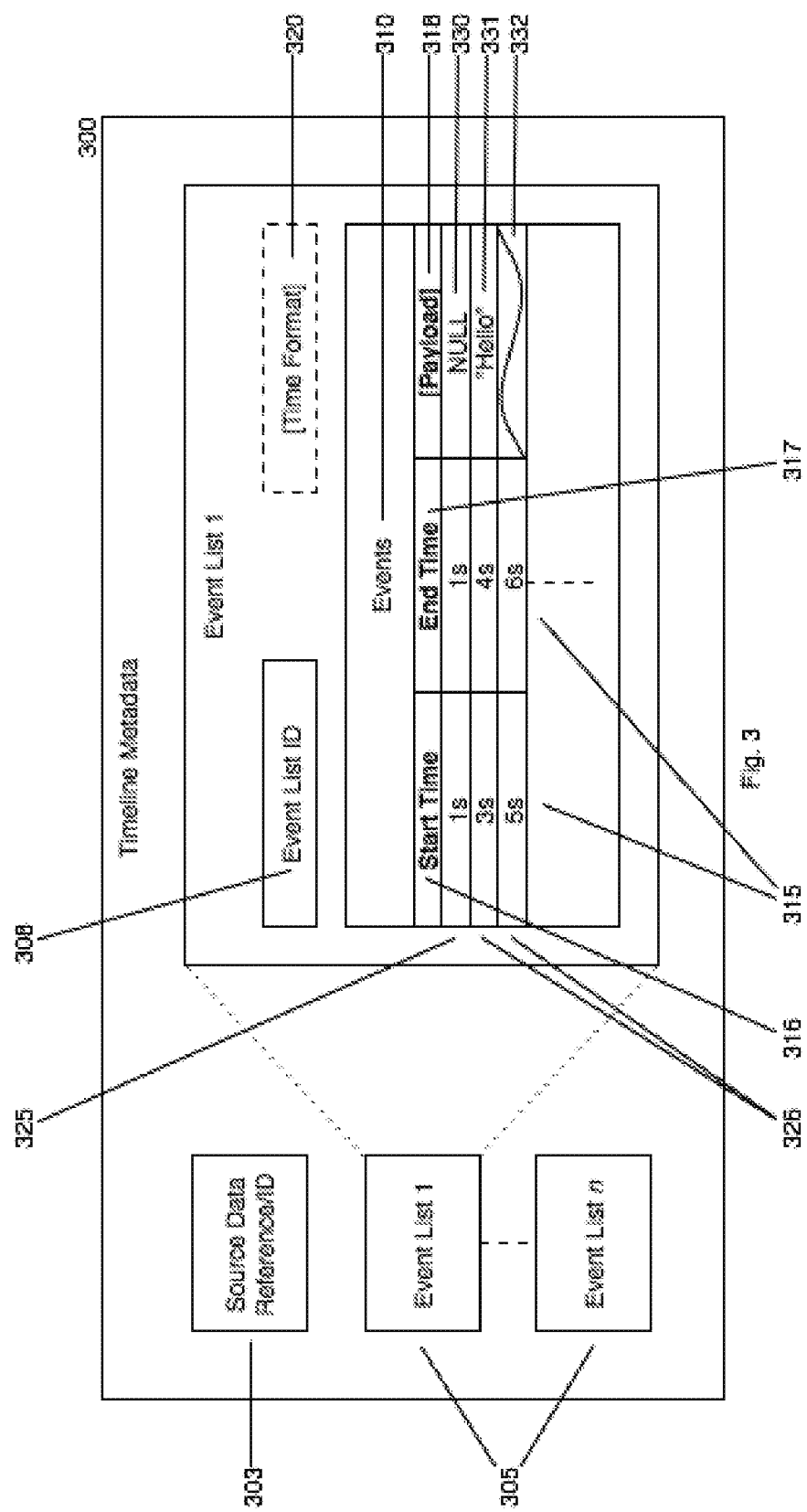
FIG. 3 is a diagram that depicts a structure of a timeline metadata.

FIG. 3 is a diagram that depicts a structure of a timeline metadata. At its core, the timeline metadata consists of a reference to a source data 303 and a multiplicity of event-lists 305 which themselves consist of an event list ID 308 and a multiplicity of events 310. Each event is described by at least one time offset 315 (e.g., one or more time offsets) within the source data's timeline and an optional payload 318. These time offsets may be expressed in terms of seconds, milliseconds, beats (e.g. in the case of music data), bytes (e.g. in the case that the source data is a stream of binary data), samples (e.g. in the case that the source data is audio data), frames (e.g. in the case that the source data is video data), or any other format that encodes a position along the source data's timeline. In another example, rather than time offsets, each event can include a start time and a duration or an end time and a duration. The start time may be expressed as "time since previous event" or "time since the beginning of the timeline." A timeline metadata, each event-list, or each event may contain a field describing the format of the time offsets 320. The earliest of an event's times is the start time 316, while the latest is the end time 317. If the start time and end time are equivalent (or the duration is 0), the end time (or duration) may be omitted from the event's representation (e.g. to save space on disk). The end time may optionally be encoded as a duration value expressing an offset from the start time. An event with no end time or end time equal to start time is an event with a duration of 0 time. Such an event 325 may be called an "instantaneous event" whereas events with a distinct end time 326 may be called a "span event".

Each event may optionally contain a payload of data 318 pertinent to the event-list 305 in which the event is located. If an event does not contain a payload, the field may contain a NULL value 330 or may be omitted from the event's representation (e.g. to save space on disk). Examples of payloads include a scalar value (−5, 1, 3.14), a color (#FF0000 or "red"), a string of text ("up", "happy", "chorus", "Hello", "here there be dragons") 331, a curve 332, as is frequently used to describe animations (e.g. bezier), a gradient of a feature or a multiplicity of features (e.g. vectors or tensors), a sequence of structures containing further timing offsets or positions paired with various values, or a more complex structure of multiple fields or structures. It should be noted that certain payload types (e.g. gradients) may intrinsically include embedded timing information/details. In one example, payloads in timeline metadata with source data that are music files may contain tempo information for the area of the timeline covered by the event. In aggregate, these payloads would create a tempo map. Each event is added to an event-list. These lists may be sorted. In one example, events in an event-list are stored in an order based on their start times. Multiple events within the same event-list may share a start time, an end time, and/or may overlap.

Figure 4:
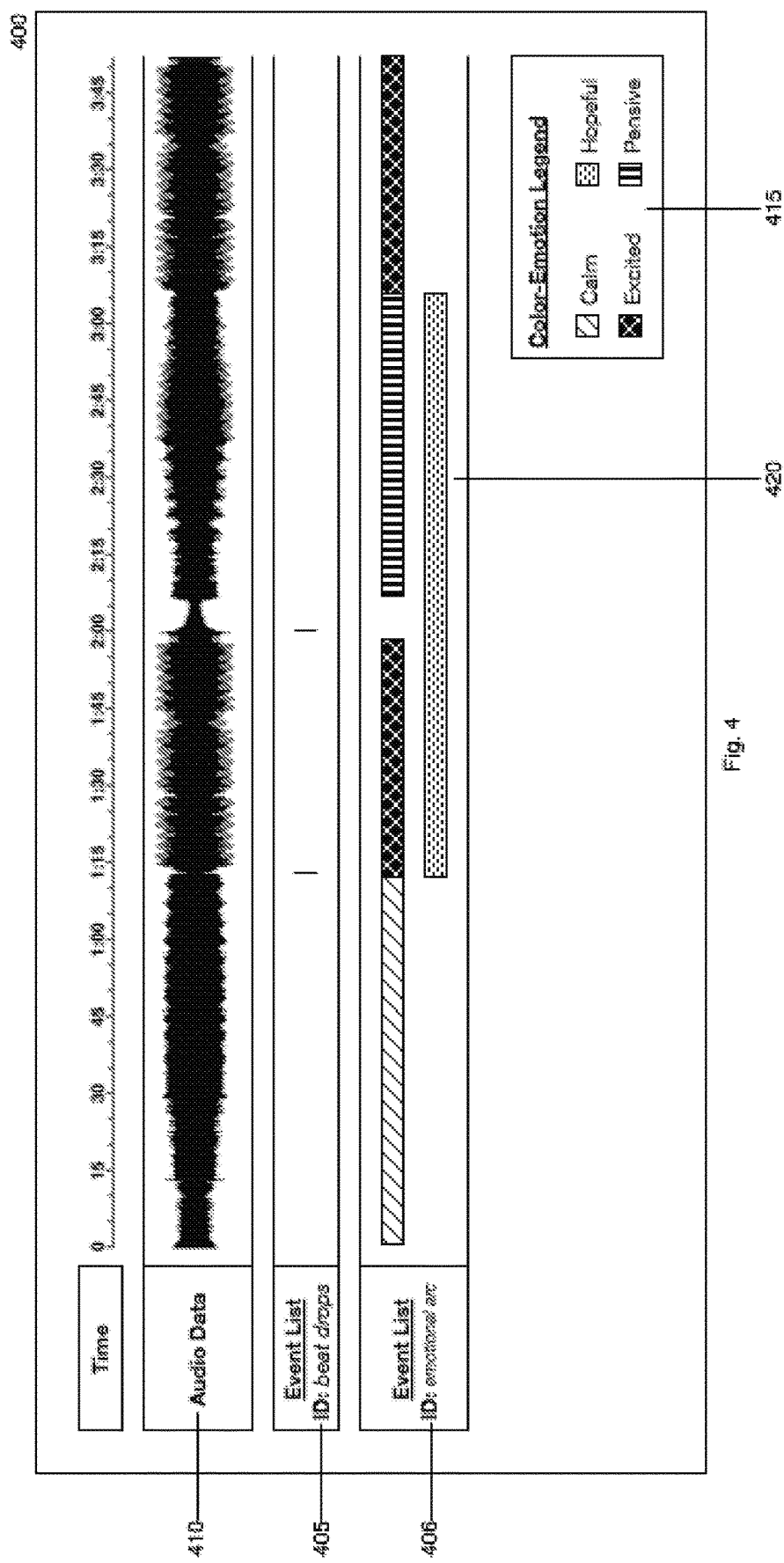
FIG. 4 is a diagram depicting two event-lists aligned to a visual representation of the source data (in this case, audio data)

Each event-list in the timeline metadata is identified by an ID 308 and may describe a single "feature". FIG. 4 is a diagram depicting two event-lists aligned to a visual representation of the source data (in this case, audio data). In one event-list, the event list ID 405 is a label that reads "beat drops". In the other event-list, the event list ID 406 is a label that reads "emotional arc". In this way, timeline metadata may be understood to contain a summary of a multiplicity of features-over-time; each event-list is some distillation of the content of the source data according to some distilling or filtering process, whether that be designed and driven by human or computer.

Each event-list in the timeline metadata may be accompanied by a "coverage" and/or "density" value. The coverage value summarizes how much of the original source data is mapped by events within the event-list. As an example, an empty event-list may have a coverage of 0, while an event-list with a single event with start time at the beginning of the source data and end time at the end of the source data may have a coverage of 1. The density value summarizes the rate at which events overlap, are clustered together, etc. A low density event-list may have sparse events, with little to no overlap between individual events. A high density event-list may have one or more "clusters" of events featuring many quick events in a short period of time and/or many overlapping events.

Figure 5:
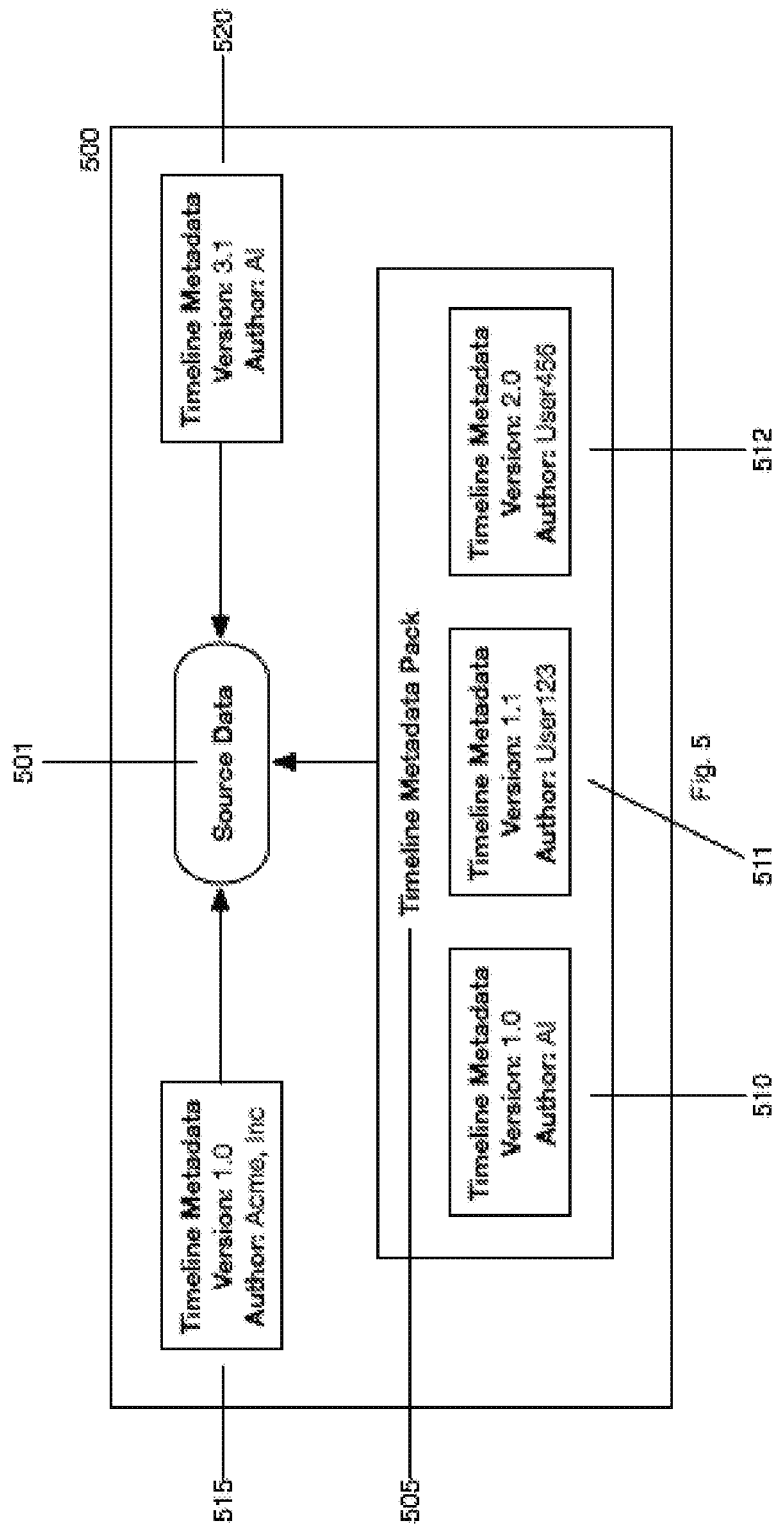
FIG. 5 is a diagram depicting timeline metadata that describes a specific source data may be a multiplicity of timeline metadata.

As depicted in FIG. 5, the timeline metadata 500 that describes a specific source data 501 may be a multiplicity of timeline metadata. A multiplicity may be referred to as a timeline metadata pack 505. In a first example, a timeline metadata pack may contain multiple revisions of the same set of timeline metadata 510, 511, and 512 (v1.0, v1.1, v2.0, respectively). A timeline metadata pack may further contain timeline metadata packs. In a second example, the multiplicity may contain timeline metadata generated by different sources, e.g. human users 511, 512, businesses 515, computer algorithms or AI 520, etc. In a third example, the multiplicity may contain timeline metadata that describe different features or aspects of the content of the shared source data.

Figure 6:
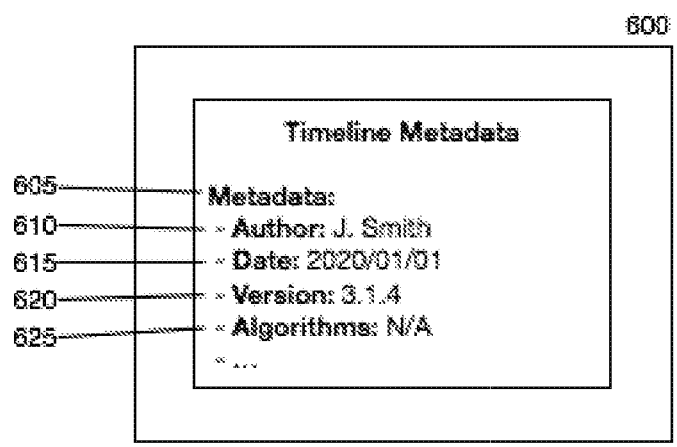
FIG. 6 is a diagram depicting timeline metadata that may have its own metadata.

As depicted in FIG. 6, the timeline metadata may have its own metadata 605 that describes e.g. who created it 610, when it was created 615, a version number 620, algorithms used to generate the metadata 625, etc.

The timeline metadata may be stored with the source data itself (e.g. alongside other metadata) or separately from it, e.g. on a different server from the source data. When the timeline metadata and source data are stored separately, information to aid in the connection of the source data and timeline metadata may be added to one or both (e.g. a source data reference 303). In one example, the timeline metadata may contain a location value (e.g. a URI) to assist in locating the source data. In another example, the source data may contain a location value to assist in locating the timeline metadata. In a third example, they may both contain an identifier field (e.g. a UUID or a content-specific "fingerprint" identifier) with matching values such that a system with access to both sets of data may link them together.

The creation of the timeline metadata may be conducted manually by a human user or automatically by a computer process (e.g. algorithm, AI). A user may use a software tool to facilitate in the generation of the timeline metadata. This software tool may allow full creation and/or configuration of event-lists, events, payloads, and related metadata and settings. The user may create the metadata while accessing some representation of the source data timeline (e.g. a visual or aural representation 410 within and/or without the tool). The user may open pre-existing timeline metadata in the tool and edit the timeline metadata, optionally saving the modifications as a new version of the original timeline metadata (510, 511, 512) or overwriting the version opened by the software. The pre-existing timeline metadata may have been generated by themselves, another user, a computer process, or any combination thereof (510, 511, 512). The pre-existing timeline metadata may be accessed on the user's local computer or from another computer or server across a network (e.g. the internet). The software tool may allow the user to import data in other formats that may be converted into the target timeline metadata format (e.g. a simple text document with Comma Separated Values [CSV] containing time offset values output by an audio analysis program).

Computer processes may be designed, programmed, trained, etc. to generate timeline metadata. A computer process may take as input the source data and output a timeline metadata, or a multiplicity thereof. In one example, the input source data is a MIDI file and the output may be a timeline metadata that contains event-lists with IDs "measures" and "impacts", where "measures" may contain one event for every measure in the piece of music, with the event's start and end times describing the start and end times of a specific measure within the piece, and "impacts" may contain one event for every drum MIDI NoteOn event with MIDI Velocity higher than a threshold value (e.g. 120). A computer process may take as input a multiplicity of source data and output a timeline metadata, or a multiplicity thereof. In one example, the source data is a set of instrument-specific recordings (frequently known as "stem tracks") and a digital sheet music (e.g. MusicXML) file and the output may be a timeline metadata that contains one event-list per stem track, each containing events determined to be significant by an algorithm that compares the instrument's score to its recording. A computer process may take as input both the source data and a multiplicity of timeline metadata and output a timeline metadata, or a multiplicity thereof. In one example, the input source data is a video file and the input multiplicity of timeline metadata is user-generated data. The computer may process the video file to generate a set of features which it then correlates with timing information stored throughout the multiplicity of input timeline metadata to assist in filtering the generated features. The resulting filtered set of data (events) may be stored in a new timeline metadata.

An intermediary representation (transformation) of the original source data may be used by a human or input into a computer process to generate timeline metadata that describes the content of the source data. The intermediary representation may be the result of a one-way transformation of the source data, such that the original source data may not be retrieved through a reverse transformation process. The format of the intermediary representation may be chosen due to usefulness for input to specific timeline metadata generation algorithms, due to a reduction in storage size as compared with the original data, etc. As with the original source data, the intermediary representation may be stored in the same or separate location as the timeline metadata. The intermediary representation may "take the place" of the original source data, enabling the original source data to be destroyed or otherwise removed. In one example, the source data is a set of music files and the intermediary representation is a corresponding set of MFCCs (Mel-Frequency Cepstral Coefficients). Once the MFCC intermediary representation exists, the original source data from which the MFCC was generated may be deleted. In this way, timeline metadata describing the original source data may be generated without directly accessing the original source data. In another example, the intermediary representation is timeline metadata (or a multiplicity thereof).

The timeline metadata may be used as training data for AI and other learning algorithms. In one example, a collection of timeline metadata as depicted in FIG. 4 is produced by human users and contains event-lists that describe the "emotional content" of music files, mapping color to emotions 415 felt in certain locations or sections 420 of the music (these locations may overlap). Timeline metadata from this collection of timeline metadata is combined with its source data and processed by the learning algorithm (e.g. Deep Learning, RNN, CNN, or descendants thereof, etc.). The algorithm may identify certain features within the source data as being predictive of certain emotions. The trained data may then take as input different music files and output timeline metadata that also describes "emotional content". In another example, the timeline metadata in the collection from the previous example may be filtered for specific emotions (identified, for example, as color, emoji (textual pictograms), textual descriptors, etc. stored in payloads attached to events) before being passed, along with the source music data, as input to a multiplicity of learning algorithms. In this manner, each learning algorithm instance is trained to look for/identify a specific emotion. These learning algorithm instances may then take as input a different set of music and each produce timeline metadata describing the contents of the music data in terms of the specific emotion upon which they were trained. The multiplicity of timeline metadata produced for a music file by the multiplicity of learning algorithms in this example may then be combined into a single timeline metadata that describes the "emotional content" of the music in aggregate.

Timeline metadata with more raw information than is stored in the source data may be produced. In one example, the source data is an audio file consisting of sample data and a timeline metadata contains an event-list with a single event for each sample in the audio data where each event contains a payload that contains the sample indexed by the event's start time. Thus, the timeline metadata is a simple copy of the audio file, albeit stored in a more complex manner.

While there is no upper limit indicated or implied on the number of events allowed in an event-list (or the number of event-lists in a single timeline metadata, for that matter), timeline metadata is best used for higher level descriptions (or representations, abstractions, etc.) of content than the source data itself. Many important or interesting use cases result in timeline metadata that is far more sparse (in temporal representation) and less dense (in memory representation) than the source data itself. One example of an "interesting use case" may be timeline metadata that describes the timings of all beats (an event-list with ID "all-beats") in a three minute source music file stored as a monaural WAV file with a sampling rate of 44100 samples per second. At 60 beats per minute, the music file would contain roughly 180 entries in the "all beats" list. Compare this with the 3*60*44100=7,938,000 samples stored in the source data. Setting aside the difficulty of algorithmically detecting beats in raw music data, simply determining whether the song contains a beat at a given moment is far faster when searching through the "all beats" metadata list than through the raw data itself. Identifying whether a source data contains a certain feature (or a certain feature at a specified time or within a specified time range) or not is far simpler when considering the timeline metadata than the source data.

Timeline metadata enables rapid processing and analysis of higher order functions and features and may be thought of as an intermediary representation of the source data. For example, a user investigating the structure of music data may evaluate the "all beats" event-list of the music's timeline metadata to quickly identify/match/etc. tempo patterns, etc. In a similar manner, multiple timeline metadata may be compared and contrasted to much more quickly identify source data that shares some content-based similarity. As an example, a user with access to a collection of timeline metadata that describes music source data may use information stored in an "emotional arc" event-list to identify all music in the collection that matches some specified portion (or all) of the emotional content of a target music file. In this manner the timeline metadata enables rapid identification of source data that matches other source data according to some metric of similarity.

Figure 7:
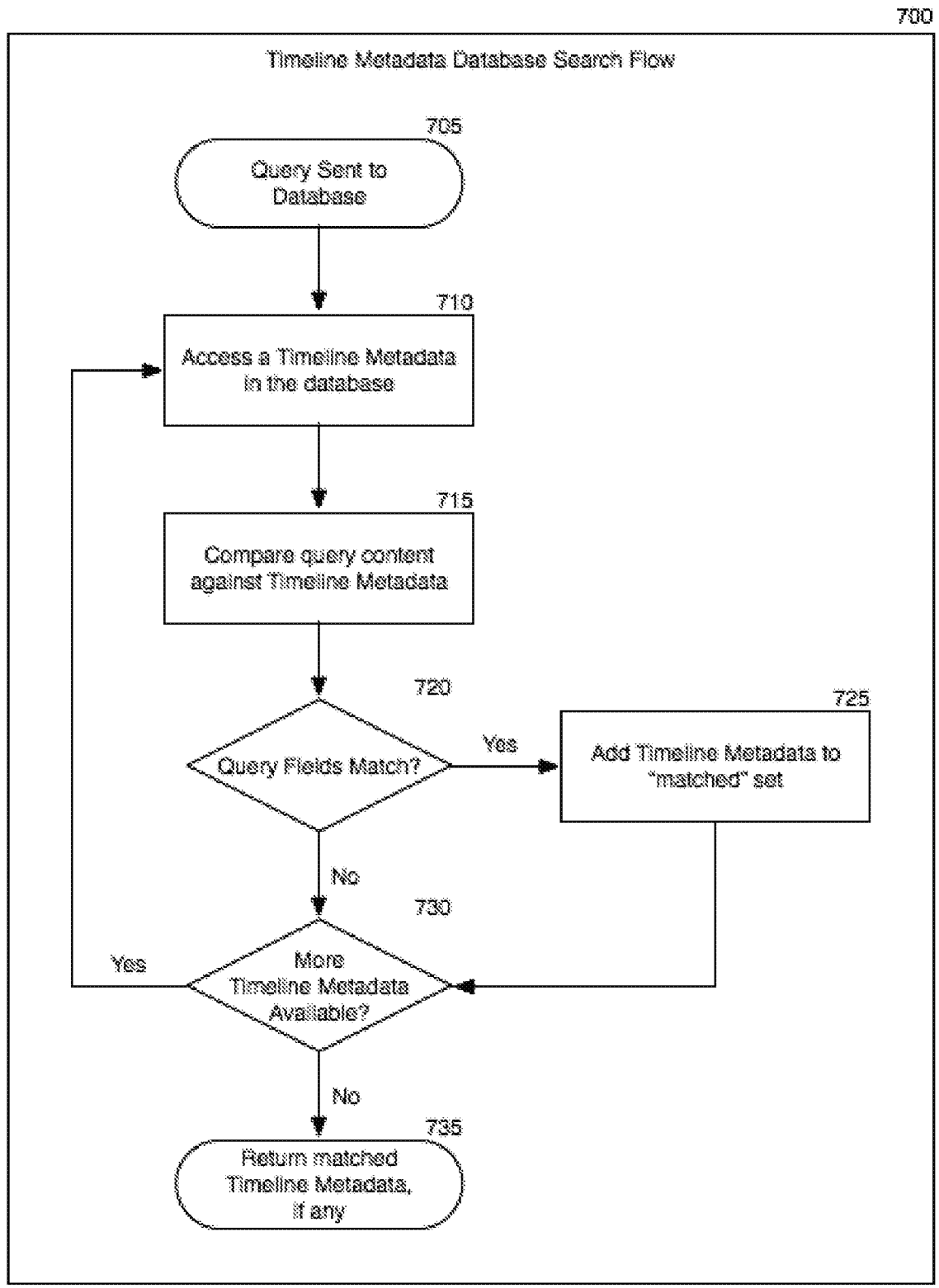
FIG. 7 is a flow chart depicting the process of searching such a database.

Timeline metadata may be stored in a database. This database may or may not also contain the source data for the collection of timeline metadata stored therein. It may be desirable for a user to search the database to quickly identify all data that matches some temporal criteria (e.g. "find music that has a beat between 30 and 30.5 seconds"). According to one aspect of the disclosure, the timeline metadata is stored in the database without any processing. FIG. 7 is a flow chart depicting the process of searching such a database. In order to identify source data that matches some specific criteria, the user may issue a request 705 (e.g., timeline lookup request 205) to the database to identify all timeline metadata that match the given criteria. The process of FIG. 7 can represent a search against a duration-based index or a event times-based index. The database accesses a timeline metadata in the database 710 and compares it against the user's query 715, matching the query against a multiplicity of events in a multiplicity of event-lists. If the timeline metadata in question does match/fulfill/satisfy the query 720, the timeline metadata is added to a temporary "matched" set 725. The database then checks to see if it contains more timeline metadata to check 730. If so, it will continue processing by accessing the next timeline metadata in the database 710. If the timeline metadata in question does not match/fulfill/satisfy the query 720, however, the database will immediately check if there is more timeline metadata to process 730. When there is no more timeline metadata for the database to compare with the user's query content 730, the "matched" set of timeline metadata is returned to the user 735. When compared with inspecting (e.g. decoding, processing, etc.) the source data directly, the user gains a massive increase in performance by searching the timeline metadata. In one example, a user may wish to identify all songs in a music database that have a beat between 30 and 30.5 seconds. The database may contain timeline metadata and may inspect all timeline metadata stored within it, quickly locating songs that have an event-list with ID "all beats" that contain at least one event that has a start time between 30 and 30.5 seconds. Searching the metadata directly is far faster than processing the music in the database.

According to one or more aspects of the disclosure, the search performance may be dramatically increased by processing the timeline metadata stored in the database, including indexing the timeline metadata in a collection by start and/or end time values of individual events. In each sorted event-list within a timeline metadata, the start time values (or end time values, depending on sorting approach) increase from 0 (as values stored in start and end time are "offsets from the timeline's start time"). Stated another way, offset can be considered as a time since previous event, with that time being calculated by comparing an event's start time with a previous event's end time (or equivalent). This can be considered a set of durations, e.g., duration between events. The source data for the timeline metadata contained within a collection may vary in total length. As all source data begins from a common start point, it is likely that there will be more overlap in time values closer to 0 than closer to the maximum length of the "longest" temporal source data represented in the collection.

Figure 8:
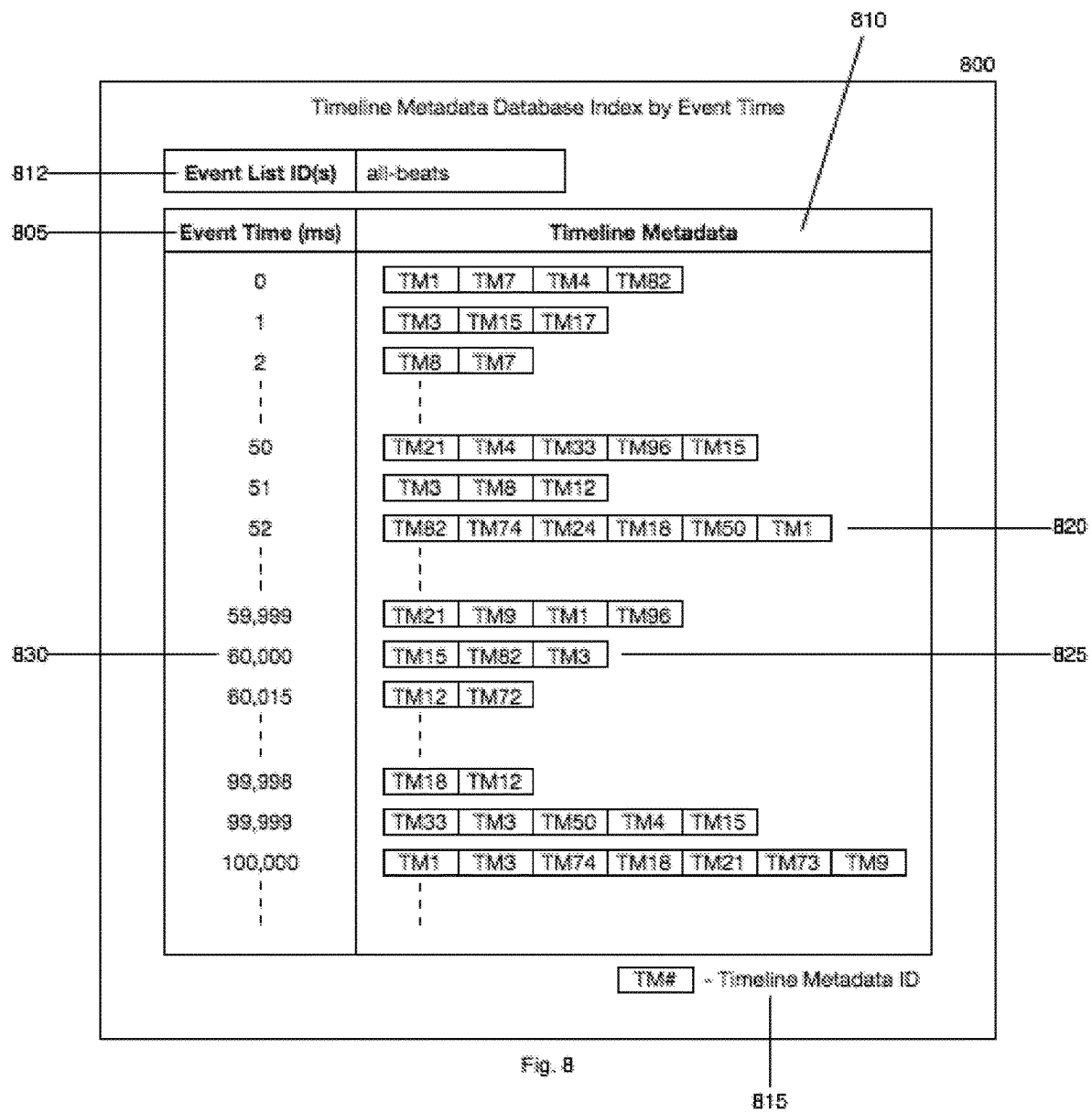
FIG. 8 is a diagram that depicts a structure of an event time index within a database of timeline metadata.

FIG. 8 is a diagram that depicts a structure of an event time index within a database of timeline metadata. By way of non-limiting example, the index structure may be conceived of as an ordered list of time entries 805, with each time entry corresponding to a list of timeline metadata 810. To generate an index based on event timings, each event 310 within a timeline metadata (or within a specific, or multiplicity of, event-list determined by event list ID(s) 812 of a timeline metadata) is inspected by start time 316. A corresponding time entry is located within the index's time entry list 805 and a reference to the timeline metadata containing the inspected event is added to the list of timeline metadata 810. The timeline metadata's collection and/or database-specific identifier 815 (e.g. file location, URI, UUID, etc.) will have a number of entries in this index data structure less-than-or-equal-to the number of the events inspected (the less-than case would occur if, for example, multiple events within an event-list or a multiplicity of event-lists within the same timeline metadata, shared a time used for indexing and the index was set to disallow non-unique index values). In this example, the resulting temporal index structure consists of a list of increasing times 805 that each correspond to one-or-more timeline metadata 810 within which at least one event exists at the time specified. It is very likely that a multiplicity of timeline metadata within a single collection of timeline metadata that map different source data may have identical event timings 820. In one example, the source data is a large set of music files that contains several songs recorded at exactly 120.00 bpm. The event-list with event list ID "all beats" 812 may contain an event at exactly 60.00 seconds for many of these songs, meaning that the corresponding timeline metadata 825 would appear in the temporal index at the 60.00 second entry 830.

In the temporal index, the process of locating timeline metadata with an event at a given time is reduced to finding the corresponding value in the sorted list of timings 805. With this sorted structure, well-known search algorithms (e.g. binary search) may be employed to very quickly locate results. In one example, a binary search algorithm is used to search the temporal index for a specific time. The asymptotic runtime complexity of this operation is known to be O (log n), where n is the number of unique time entries in the index. When no temporal index exists and each timeline metadata must be individually searched, the runtime complexity is O (x log y), where x is the number of event-lists considered for the search across all timeline metadata in the database and y is the expected number of events in any given event-list. In this latter case, the number of event-lists that must be examined can quickly dwarf the number of unique time entries in the temporal index.

The temporal index may also be optimized based on precision of time used to create index entries. This precision places an upper bound on the number of possible entries that exist in a given index over a given period of time. In one example, a user may specify that index entries have a precision of a single centisecond (0.01 seconds). When added to the index, any timeline metadata containing an 'indexed event' with time value between 0.01 and 0.01999 . . . may be added to the 0.01 index entry in the temporal index. With this precision, the maximum number of possible index entries created for any given minute of timeline is 6,000. Similarly, if the precision specified is a single millisecond 805 (0.001 seconds), then a maximum of 60,000 entries per minute may be created. A database user may adjust the precision of the indexed values to control the size of the initial search space. If further precision is required, a secondary search of the results returned by the initial search may be performed. In one example, the structure of the temporal index may be a hierarchical tree, where each level of depth increases the precision. In this example, the tree may support arbitrary precision, limited only by the precision of the temporal data being indexed. In this example, fast performance may be maintained as a binary search might return an entire subtree (or subtrees) without having to investigate each timeline metadata directly (stopping only when the desired precision was met).

A user may initiate a search that requires lower precision than the precision of entries of a given temporal index. The user may manually compensate for this by searching for a range of timings (e.g. 0.01 and 0.01999 . . . ). Such a search operation would return timing metadata referenced in a multiplicity of "adjacent" temporal index entries. The search interface of the database may be programmed or configured to recognize this scenario and automate this compensation. The structure of the temporal index may be designed to assist in retrieving entries given this type of operation (e.g. the previously described hierarchical tree structure).

Other aspects of the timeline metadata may be used to create indexes to increase the performance of a multiplicity of searches conducted against a collection of timeline metadata. An index may be produced based on the existence of a certain type or class of event payloads 318 and/or the configuration of a certain type or class of event payloads. In one example, a user of a database that contains timeline metadata that describes music files may be interested in identifying music that contains certain emotional content. The user may create an index on the payload content of events in event-lists with the "emotions" ID. The user may then quickly search for songs containing the "anger" emotion.

Figure 9:
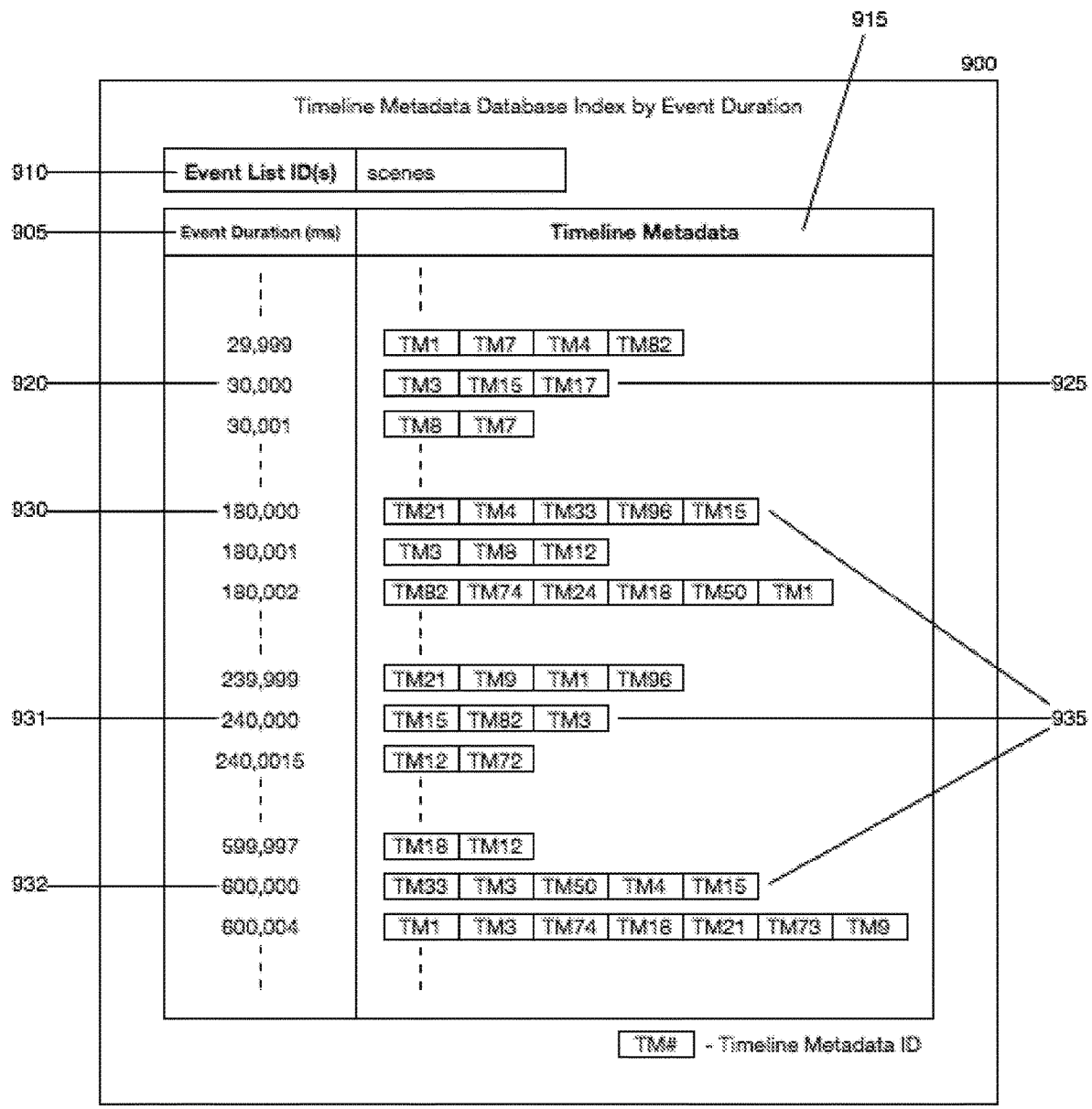
FIG. 9 is a diagram depicting an index based on the duration of events.

A user may be interested in the duration of events within the timeline metadata. As depicted in FIG. 9, such a user may create an index based on the duration of events 905 (e.g. "end time 317-start time 316", "duration", "[start time of a subsequent event]-[start time of an event]", etc.) within an event-list or a multiplicity of event-lists within each timeline metadata stored in the database. In one example, a user of a database that contains timeline metadata that describes movie content may be interested in identifying movies that contain scenes that last a certain amount of time. The user may create an index on the duration of events contained in event-lists with the "scenes" ID 910. The user may then quickly search for movies that contain scenes that last a specified length of time (e.g. 30 seconds) by accessing the list of timeline metadata 925 identified by a specific event duration 920. In another example, a user may be interested in identifying movies that contain a sequence of scenes that each last a specific duration (e.g. 3 mins, 10 mins, and then 4 mins). The user may use the previously described index to search for all times in the sequence (930, 932, 931) to identify timeline metadata 935 (and thus movies) that contain such durations as a first result. The user may then do a secondary search on timeline metadata of this first result to identify timeline metadata containing the sequence of durations in the order specified. In another example, a user may be interested in identifying movies that contain a sequence of scenes that last a specific duration (as above). The user may create an index of sequence pairs of sequential event durations contained in event-lists (e.g. [event1_duration, event2_duration], [event2_duration, event3_duration], [event3_duration, event4_duration], . . . ). The user may then break up the desired "search sequence" into sequence-pairs (e.g. [3 mins, 10 mins] and [10 mins, 4 mins]) and use those with the index of sequence pairs to quickly identify movies that contain such duration pairs as a first result. The user may then do a secondary search on the timeline metadata of the first result to identify movies that contain the sequence-pairs in the order outlined in the original "search sequence". (The duration sequence-pairs index may be slightly faster than the raw duration index at the expense of more database memory to store the combinations.)

References to timeline metadata stored in index entries (e.g. 810, 915) may be augmented with extra information (e.g. other information stored within the timeline metadata or transformations thereof). For example, in the case of a payload configuration index, this extra information may be a value that indicates the number of times the given payload configuration was identified within the given timeline metadata. In this way, extra information is encoded into the index entry and may be used to rank or order timeline metadata results stored in the index entry. In one example, the augmentation data may be the number of times the specific payload configuration occurred within the timeline metadata. In another example, the augmentation data may include the duration of the event that caused the timeline metadata reference to be stored in the index entry.

Indexes as heretofore described may be created in databases containing timeline metadata that describe different types of temporal data (e.g. music and video files). Such indexes may contain references to timeline metadata of a specific type of temporal data or a multiplicity of types of temporal data. In this manner, a user may quickly search for and identify source data of one type that contains similarities to source data of another type. In one example, an index over duration of events in timeline metadata is created over a database that includes videos of sporting events and music files. Results returned by looking up a duration in this index may contain video footage and music that may pair well together when combined.

In many cases it is advantageous to use existing keyword metadata as a filter when working with timeline metadata. In this regard, the timeline lookup request 205 described above may include the one or more search times to be compared to event times or durations in addition to one or more additional search criteria based at least in part upon at least one characteristic of the audio file, such as file size, creation date, creation decade, author name, keyword tags, total runtime, genre, and/or event list ID (e.g., event list ID 308), etc. In this example, the comparison of search times and the additional search criteria can be done sequentially (e.g., search times and then additional criteria) or can be done simultaneously with the results later combined. The additional criteria, such as keyword metadata may be used as a filter when creating an index (creating one or more independent index structures). In one example, a music database containing timeline metadata may use additional criteria (e.g., criteria unrelated to event-time or event-duration such as one or more of file size, creation date, creation decade, author name, keyword tags, total runtime, genre, and/or event list ID (e.g., event list ID 308), etc.) to create several distinct instances of a given timeline metadata index based on the additional criteria, such as distinct instances of a given timeline metadata index relating to separate and distinct decades (e.g., 1980s, 1970s, etc.). In this manner, a user searching for music matching a specific content criteria (e.g. that it contains a beat between 30 seconds and 30.25 seconds) may identify the index corresponding to the target decade prior to searching the index by content criteria. In this manner, they have reduced the size of the index that must be searched. The keyword metadata may also be used as a filter of results returned from a search of a specific index. In another example, a music database containing timeline metadata may contain a "compound index" consisting of ["decade" keyword value, beat timing value] pairs.

In this manner, a user searching for music matching a specific content criteria (as above) may identify results within a single index. In a further example, a user may search an index containing references to all of the timeline metadata in the database. The set of results returned from the index may then be filtered by the keyword metadata (e.g. for existence of the keyword, a given value for the keyword, etc.).

Indexes created using event timing information may be used directly for fast meta-analysis of large amounts of data. Patterns and abnormalities/irregularities/outliers/etc. may be detected by looking directly at the number of events stored at each index entry. In one example, the source data may be time-series data with recorded measurements of door openings for a building with each instance of source data containing information over a 24-hour period. The user may create an index over door opening timings. A user may then analyze the index itself, comparing the number of entries in each instance and search for abnormalities (e.g. door openings for an office building between the hours of 3 am and 4 am) or patterns (e.g. spikes in the number of door openings at 8 am, noon, and 5 pm). In another example, a user may be interested in the predominant structure of the top 1000 pop songs. An index created using some desired feature from timeline metadata (which maps to the top 1000 pop songs) may quickly reveal commonalities/tendencies/patterns in the internal/temporal/etc. structure of those songs.

Searching, comparing, and analyzing temporal data (e.g. music, videos, etc.) is a complex, time consuming process. Timeline metadata, generated by humans, computers, or a combination thereof, enables novel and efficient searching, analysis, and comparison of the source temporal data. This efficiency is further improved through indexing of temporal information within the timeline metadata, optionally augmented with further information stored within the timeline metadata or standard keyword metadata.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A method of generating and indexing timeline metadata, comprising:
   generating at least one timeline metadata from timeline data, each timeline metadata comprising a reference to the timeline data, at least one event list, each event list comprising an event list ID and at least one event;
   inspecting each event within the at least one timeline metadata;
   identifying, by event time, at least one event time within the at least one event in the timeline metadata;
   adding the identified event time to an event time index, the event time index comprising a correspondence between the at least one event time and the timeline metadata;
   identifying, by event duration, at least one event duration within the at least one event in the timeline metadata;
   adding the identified event duration to an event duration index, the event duration index comprising a correspondence between the at least one event duration and the timeline metadata, the event duration index being sorted by event duration;
   receiving a timeline lookup request comprising at least one search time;
   determining a type associated with the timeline lookup request, the type comprising at least one of event time-based or event duration-based;
   when the type associated with the timeline lookup request is event time-based, then comparing the at least one search time to at least one event time in the event time index to identify at least some timeline metadata that matches the at least one search time;
   when the type associated with the timeline lookup request is event duration-based, then comparing the at least one search time to the at least one event duration in the event duration index to identify at least some timeline metadata that matches the at least one search time; and
   providing matched timeline metadata in response to the timeline lookup request.

2. The method of claim 1, wherein the timeline data comprises at least one of an audio file or a video file.

3. The method of claim 1, wherein the timeline metadata comprises source data and a plurality of event-lists.

4. The method of claim 3, wherein the timeline metadata further comprises at least two time offsets and a payload.

5. The method of claim 4, wherein the payload is null.

6. The method of claim 3, wherein the timeline metadata further comprises a duration and at least one of a start time or stop time.

7. The method of claim 3, wherein each event-list of the timeline metadata comprises an event list ID.

8. The method of claim 7, wherein the event list ID is representative of at least one aspect of the timeline data associated with the event-list of the timeline metadata.

9. The method of claim 7, wherein the event list ID is representative of emotional content of the timeline data associated with the event-list of the timeline metadata.

10. The method of claim 1, further comprising generating a second timeline metadata from the timeline data, the second timeline data being distinct from the timeline metadata.

11. The method of claim 1, wherein the timeline lookup request further comprises additional search criteria based at least in part upon the audio file.

12. The method of claim 11, wherein the additional search criteria includes at least one or more of file size, creation date, creation decade, author name, keyword tags, total runtime, genre, or event list ID.

13. A method of generating and indexing timeline metadata, comprising:

generating at least one timeline metadata from timeline data, each timeline metadata comprising a reference to the timeline data, at least one event list, each event list comprising an event list ID and at least one event;

inspecting each event within the at least one timeline metadata;

identifying, by event time, at least one event time within the at least one event in the timeline metadata by event time or event duration;

adding the identified event time to an event time index, the event time index comprising a correspondence between the at least one event time and the timeline metadata;

identifying, by event duration, at least one event duration within the at least one event in the timeline metadata;

adding the identified event duration to an event duration index, the event duration index comprising a correspondence between the at least one event duration and the timeline metadata, the event duration index being sorted by event duration;

receiving a timeline lookup request comprising at least one search time;

comparing the at least one search time to one of the event time index or event duration index to identify at least some timeline metadata that matches the at least one search time; and providing matched timeline metadata in response to the timeline lookup request.

14. The method of claim 13, further comprising determining a type associated with the timeline lookup request.

15. The method of claim 14, wherein the timeline lookup request is determined to be one of event duration-based or event time-based.

16. A system for of generating and indexing timeline metadata, comprising:

a memory having computer executable instructions stored thereon;

one or more processors that when executing the instructions are configured to:

generate at least one timeline metadata from timeline data, each timeline metadata comprising a reference to the timeline data, at least one event list, each event list comprising an event list ID and at least one event;

inspect each event within the at least one timeline metadata;

identify, by event time, at least one event time within the at least one event in the timeline metadata;

add the identified event time to an event time index, the event time index comprising a correspondence between the at least one event time and the timeline metadata;

identify, by event duration, at least one event duration within the at least one event in the timeline metadata by event duration;

add the identified event duration to an event duration index, the event duration index comprising a correspondence between the at least one event duration and the timeline metadata, the event duration index being sorted by event duration;

receive a timeline lookup request comprising at least one search time;

compare the at least one search time to one of the event time index or event duration index to identify at least some timeline metadata that matches the search time; and provide matched timeline metadata in response to the timeline lookup request.

17. The method of claim 13, wherein the event duration index comprises at least one specific event duration and at least one list of timeline metadata associated with the at least one specific event duration.

* * * * *